(12) United States Patent
d'Agostini (10) Patent No.: US 6,937,974 B1
(45) Date of Patent: Aug. 30, 2005

(54) TRANSLATION SYSTEM AND A MULTIFUNCTION COMPUTER, PARTICULARLY FOR TREATING TEXTS AND TRANSLATION ON PAPER

(76) Inventor: Giovanni d'Agostini, Via Giusti, 17, Udine (IT) I-33100

( * ) Notice: Subject to any disclaimer, the term of this patent is extended or adjusted under 35 U.S.C. 154(b) by 0 days.

(21) Appl. No.: 09/622,396

(22) PCT Filed: Feb. 19, 1999

(86) PCT No.: PCT/IT99/00040

§ 371 (c)(1),
(2), (4) Date: Sep. 29, 2000

(87) PCT Pub. No.: WO99/45476

PCT Pub. Date: Sep. 10, 1999

(30) Foreign Application Priority Data

Mar. 3, 1998 (IT) .............................. UD98A0032

(51) Int. Cl.[7] .......................................... G06F 17/28
(52) U.S. Cl. .............................. 704/2; 704/8; 704/277
(58) Field of Search ............................... 704/1, 2, 3, 8, 704/275, 231, 277; 440/77; 399/361; 715/533

(56) References Cited

U.S. PATENT DOCUMENTS

| | | | | |
|---|---|---|---|---|
| 4,502,128 A | * | 2/1985 | Okajima et al. | 704/8 |
| 4,800,522 A | * | 1/1989 | Miyao et al. | 704/2 |
| 4,971,587 A | * | 11/1990 | Uchida et al. | 440/77 |
| 5,063,508 A | * | 11/1991 | Yamada et al. | 704/3 |
| 5,101,349 A | | 3/1992 | Tokuume | |
| 5,257,187 A | | 10/1993 | Suzuki | |
| 5,289,375 A | * | 2/1994 | Fukumochi et al. | 704/2 |
| 5,349,368 A | * | 9/1994 | Takeda et al. | 704/3 |
| 5,351,189 A | * | 9/1994 | Doi et al. | 704/3 |
| 5,625,553 A | * | 4/1997 | Kutsumi et al. | 704/2 |

(Continued)

FOREIGN PATENT DOCUMENTS

EP      0 176 858      4/1986

(Continued)

OTHER PUBLICATIONS

Asano et al (Derwent 1896-312850) U.S. Patent 4,800, 522A.*

*Primary Examiner*—Vijay Chawan
(74) *Attorney, Agent, or Firm*—Egbert Law Offices (57) ABSTRACT

An interactive paper translation using alternate dictionaries includes: a first storage for storing words and strings of more words with respective correct translations so that it forms a dictionary of words and sentences or sentence portions; a second receiver for receiving a text to be translated; a third storage for storing the translated text in the second screen field; and a fourth searcher for searching in progression for the words of the text to be translated. The method compares translated words with the words of the first storage to obtain a progressive translation and forms a completely automatic translation or an interactive translation or vice versa, before beginning the translation. During the option of interactive translation, there are further displays and windows. The method may also involve a scanner integrated with OCR for direct loading of the sheets to be translated.

1 Claim, 7 Drawing Sheets

U.S. PATENT DOCUMENTS

| | | | |
|---|---|---|---|
| 5,697,789 A * | 12/1997 | Sameth et al. | 704/8 |
| 6,085,162 A * | 7/2000 | Cherny | 704/277 |
| 6,304,742 B1 * | 10/2001 | Nunes et al. | 399/361 |
| 6,393,443 B1 * | 5/2002 | Rubin et al. | 715/533 |
| 6,408,266 B1 * | 6/2002 | Oon | 704/1 |
| 2002/0169616 A1 * | 11/2002 | Brooks et al. | 704/275 |

FOREIGN PATENT DOCUMENTS

| | | | | |
|---|---|---|---|---|
| FR | 2659491 | * | 3/1990 | G06F 15/38 |
| JP | 59-206985 | * | 11/1984 | G06F 15/38 |
| JP | 05-089165 | * | 4/1993 | G06F 15/38 |
| JP | 2001-117920 | * | 4/2001 | G06F 17/28 |

* cited by examiner

TRANSLATION SYSTEM AND A MULTIFUNCTION COMPUTER, PARTICULARLY FOR TREATING TEXTS AND TRANSLATION ON PAPER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

This invention relates to a translation system and a multifunction computer, particularly for treating texts and translation on paper.

The translation system is also part of this invention.

BACKGROUND OF THE INVENTION

In prior art there is a great plurality of computers able to do translations and machine translation systems.

The most known ones follow.

U.S. Pat. No. 5,677,835—Oct. 14, 1997, in the name of Caterpillar Inc., Peoria, Ill., USA This substantially regards: a system of integrated computer-based processes for monolingual information development and multilingual translation. An interactive text editor enforces lexical and grammatical constraints on a natural language subset used by the authors to create their text, which clarify text to ensure translatability. The resulting translatable source language text undergoes machine translation into any one of a set of target languages, without the translated text requiring any post-editing.

U.S. Pat. No. 5,510,981; Oct. 28, 1993; (International Business Machines Corporation, Armonk, N.Y.), regards a language translation apparatus and method using context-based translation models. In particular, there is an apparatus for translating a series of source words in a first language to a series of target words in a second language. For an input series of source words, at least two target hypotheses, each including a series of target words, are generated. Each target word has a context comprising at least one other word in the target hypothesis. For each target hypothesis, there is a language model match score including an estimate of the probability of occurrence of the series of words in the target hypothesis.

At least one alignment connecting each source word with at least one target word in the target hypothesis is identified. For each source word and each target hypothesis, a word match score including an estimate of the conditional probability of occurrence of the source word, given the target word in the target hypothesis which is connected to the source word and given the context in the target hypothesis of the target word which is connected to the source word.

For each target hypothesis, a translation match score includes a combination of the word match scores for the target hypothesis and the source words in the input series of source words. A target hypothesis match score includes a combination of the language model match score for the target hypothesis and the translation match score for the target hypothesis. The target hypothesis having the best target hypothesis match score is output.

U.S. Pat. No. 5,384,701—Jun. 7, 1991 in the name of British Telecommunications public limited company, London, England, regards a Language translation system, and in particular, the present language translation system for translating phrases from a first language into a second language comprises a store holding a collection of phrases in the second language.

Phrases input in the first language are each characterized on the basis of one or more keywords, and the corresponding phrase in the second language is output. Such a phrasebook approach enables what is effectively a rapid and accurate translation, even from speech. Since the phrases in the second language are prepared in advance and held in store, there need be no problems of poor translation or ungrammatical construction. The output may be in text, or, using speech synthesis, in voice form. With appropriate choice of keywords it is possible to characterize a large number of relatively long and complex phrases with just a few keywords.

U.S. Pat. No. 5,338,976—Jun. 16, 1992, in the name of Ricoh Company, Ltd., Tokyo, Japan, regards an Interactive language conversion system; and in particular, the present language conversion system includes a database of expression patterns in the object language, a relevance evaluation mechanism for evaluating a relevance of each expression pattern in the object language with respect to an input in the original language, a retrieval and identification mechanism for retrieving and identifying from the input in the original language information requested by the expression pattern in the object language required to generate an output in the object language, a selection mechanism for selecting the expression pattern in the object language conforming to the input in the original language depending on the relevance evaluated in the relevance evaluation mechanism, an output mechanism for generating the output in the object language based on the required information retrieved and identified from the input in the original language by the retrieval and identification mechanism, and a control mechanism for controlling operation sequences of the relevance evaluation mechanism, the retrieval and identification mechanism, the selection mechanism and the output mechanism.

U.S. Pat. No. 5,659,765: Machine translation system in the name of Toppan Printing Co., Ltd., Tokyo, Japan, filed on Mar. 14, 1995, claims a machine translation system comprising: a first language; a second input means for inputting a second character string written in a second language; a display means for simultaneously displaying the first and second character strings input from said first and second input means; a linking means which has first designating means for designating a third character string included in the first character; a string displayed by said display means, and second designating means for designating a fourth character string included in the second character string displayed by said display means, and linking the third and fourth character strings with each other; a recording means for recording the third and fourth character strings linked by said linking means as a pair; and a means for detecting the character string which is most similar to an original character string written in the first language from a plurality of recorded third character strings, and translating the original character string into a character string written in the second language by using a fourth character string linked with the detected character string.

U.S. Pat. No. 5,426,583—Jan. 27, 1994—in the name of Uribe-Echebarria Diaz De Mendibil; Gregorio, Erandio, Bilbao, Spain, regards an automatic interlingual translation system, claiming a method for use in a computer to automatically translate a first text based on a source language to a second text based on a different target language. The method comprises the steps of: (a) analyzing said first text to achieve an arborescent-type clarification on morphological, syntactical and semantic characteristics of said first text; (b) translating the analyzed text to a first intermediate language, wherein said first intermediate language contains structural characteristics of said source language; (c) integrating the translated text into a meta-language containing morphological, syntactical, and semantic features of a plurality of languages; (d) translating the integrated text to a second intermediate language, wherein said second intermediate language contains structural characteristics of said target language; and (e) converting the translated, integrated text to said second text.

U.S. Pat. No. 4,604,698—Dec. 22, 1983—in the name of Sharp Kabushiki Kaisha, Osaka, Japan, regards an electronic translator including character input keys for inputting a first language word, a translator for translating the inputted first language word into the second language word, a retranslator for retranslating the second language word back to the first language word, and a display unit for displaying the inputted word, translated word and retranslated word.

U.S. Pat. No. 4,439,836 Oct. 22,1980—in the name of Sharp Kabushiki Kaisha, Osaka, Japan, regards an electronic translator, claiming: an electronic translator device for obtaining a second word represented in a second language equivalent to an input word in a first language, comprising: input means for entering the input word; first memory means for memorizing a plurality of first words in the first language, each of said first words comprising one or more first letters which remain unchanged regardless of inflection and one or more second letters which change according to inflection; address means operatively connected to said input means and responsive to entry of the input word for addressing said first memory means to develop one of the plurality of first words; detection means operatively connected to said first memory means and responsive to said address means for detecting equivalency between the input word and said first 1 letters of respective first words; second memory means for memorizing a plurality of second words in the second language corresponding to first words stored in said first memory means; first means operatively connected to said detecting means for activating said second memory means whereby said second memory means develops a second word corresponding to the input word when the input word is equivalent to one of said first words; and second means operatively connected to said detecting means for indicating that one of said first words in said first memory means comprises a noninflected form of the input word.

U.S. Pat. No. 4,633,435—Jul. 22, 1985—in the name of Sharp Kabushiki Kaisha, Osaka, Japan, regards an electronic language translator capable of modifying definite articles, and in particular, the present invention is an electronic translator in which sentences as stored are modified by replacing one or more words in one of the original sentences with one or more new words and by changing automatically one or more additional words in the original sentence, depending on the nature of the one or more new words entered in the sentence. For example, the one or more additional words may be definite articles or prepositions.

U.S. Pat. No. 4,831,529—Feb. 12, 1987—in the name of Kabushiki Kaisha Toshiba, Kawasaki, Japan, regards a machine translation system. The machine translation system for translating a first language into a second language, comprises: input means for entry of an original written sentence in the first language into the system; dictionary means having at least a first dictionary for storing various words in various parts of speech and their translation in the second language respectively corresponding to the words in the first language, and a second dictionary for storing various words designated as nouns corresponding to words in the first language; translation means for analyzing the original written sentence in the first language, for retrieving said dictionary means and for executing the translation processing of the input original, when any of the same words designated as nouns stored in the first dictionary is found in the second dictionary, the word stored in the second dictionary takes precedence over that in the first dictionary in the translation means; and output means for producing translated sentences in the second language obtained from said translation means.

U.S. Pat. No. 5,020,021—Jan. 10, 1986—in the name of Hitachi, Ltd., Tokyo, Japan, regards a system for automatic language translation using several dictionary storage areas and a noun table, and in particular regarding a translation method for a machine translation system provided with apparatus for parsing a source language sentence and for forming a target language translation in which a phrase omitted in the source language sentence is identified, and a word or phrase to be inserted for the omitted phrase is selected from stored words and phrases. For identifying an omitted phrase, a sentence pattern corresponding to a predicate in the source language sentence is formed so as to include not only cases governed by the predicate but also a semantic feature for each case. By comparing the source language sentence with the sentence pattern, a case which is omitted in the source language sentence but cannot be omitted in the target language translation is identified. For determining a word or phrase to be placed at the position of the omitted phrase, the nouns having appeared in the source language text are stored as nouns, together with the semantic feature, gender, person and number of each noun. A noun having the same semantic feature is searched for as the omitted phrase. When a target language translation of the source language sentence is formed, a pronoun having the same gender, person and number as the omitted phrase is used as a target language equivalent for the omitted phrase, and thus a target language translation which is grammatically correct, is obtained.

U.S. Pat. No. 5,093,788—Jun. 25, 1987—in the name of Sharp Kabushiki Kaisha, Osaka, Japan, regards a translation machine system with splitting and combining of sentences. The inventor claims an electronic translation machine system for translating multiple sentences from a source language to a target language comprising: input means for inputting a plurality of source sentences; first buffer means in communication with said input means for storing said source sentences; position designation means coupled with said first buffer means for designating a division point separating a selected source sentence into parts and for inserting a position designation symbol in said selected source sentence; splitting means in communication with said first buffer means for scanning said selected source sentence for said position designation symbol and, once encountered, for splitting said selected source sentence into parts and for storing said parts in said first buffer means; and translation means for translating the parts of said selected source sentence stored in said buffer means from said source language to said target language.

U.S. Pat. No. 5,175,684—Dec. 31, 1990—in the name of Trans-Link International Corp., Honolulu, Hi., regards an automatic text translation and routing system, claiming a machine translation system.

There is a machine translation module which is capable of performing machine translation from input text of a source language to output text of a target language, said machine translation module having a plurality of target language submodules for performing machine translation into a plurality of different target languages.

There is also a receiving interface for receiving via a first telecommunications link an electronic input which is divided into pages, said input pages including a cover page having predefined fields containing system information therein and at least one text page in a source language, wherein said cover page includes at least a first predefined field designating an address of an addressee to which translated output text is to be sent, and a second predefined field designating a selected one of the plurality of different target languages into which the at least one text page is to be translated, and wherein said receiving interface includes a recognition module capable of electronically recognizing the address of the addressee designated in said first predefined field of the cover page of the received input pages, and the selected target language designated in said second predefined field of the cover page.

There is also a sending interface for sending output text generated by said machine translation module to an addressee via a second telecommunications link; and a control means coupled to said receiving interface, said machine translation module, and said sending interface for recognizing the address and target language designated in said predefined fields of said cover page, for controlling said machine translation module to generate output text of the designated target language from the input text of the source language, and for operating said sending interface to automatically send the translated output text via the second telecommunications link to the designated address recognized from said predefined fields of said cover page.

U.S. Pat. No. 5,303,151—Feb. 26, 1993—in the name of Microsoft Corporation, Redmond, Wash., regards a method and system for translating documents using translation, and claiming a computer system for translating a source language document written in a source language to a target language document written in a target language, the source language including a multiplicity of source terms and the target language including a multiplicity of target terms, the computer system including a display screen, the source language document, a product glossary having a plurality of source terms from the source language and a plurality of target terms from the target language, each source term being associated with the corresponding target term which translates the source term into the target language.

The computer system comprises: means for producing a translation screen portion on the display screen, the translation screen portion including a current insertion point; means for displaying the source language document on the translation screen portion; means for comparing each of the plurality of source terms from the product glossary with the source terms in the source language document; inserting means for inserting a character adjacent to the source term in the source language document, in response to each comparison by the comparing means which produces a match between one of the source terms in the source language document and one of the source terms in the product glossary; means for associating in an index file the inserted character with a target term from the product glossary that translates the matched source term from the source language into the target language; means for inputting an insert target term command which contains a translation request character corresponding to the inserted character; means for retrieving the translation request character from the insert target term command; means for retrieving from the index file the target term associated with the retrieved translation request character; and means for inserting the retrieved target term on the translation screen portion in response to the insert target term command.

EP-A-0176858 (SHARP KK) April 1986, discloses: A translation system performing translation from a first language into second language under an interaction mode between said translation system and an operator, comprising means for inputting original sentences to be translate, means for translating the input sentence of said first language into output sentences of said second language, wherein the operator inputs information relating to at least one word of the input sentence then the translation is performed on the basis of said input information.

Prior Art Drawbacks

The prior art drawbacks substantially consist in that they do not allow the operator to reach a suitable operational performance. Even in the latter EP-A-0176858 (SHARP KK) solution, the operator identifies first the qualification of input sentence words, then translation is performed.

BRIEF SUMMARY OF THE INVENTION

Purpose of the present invention is that of obviating the above mentioned drawbacks.

The problem is solved as claimed by a machine translation system and respective translator comprising:

first means for the storing of words and strings with more words with respective correct translations forming a dictionary of words and sentences or sentence portions;

second means for receiving a text to be translated on a screen field; and third means for storing the translated text into a second screen field;

fourth means for progressively searching the words of the text to be translated and comparing them with said first means words for obtaining a progressive translation; and means for having an option between a completely automatic form of translation or an interactive one or vice versa before beginning the translation, wherein said interactive translation option further comprises: means for displaying on a disappearing window on said screen; the words missing during the word search; the sentences translated when each sentence translation is complete.

The window further allows their correction and storage such that the interactive translation option further comprises: means for highlighting and storing a translated sentence word or portion, concerning a possible modification by the operator and means for highlighting and storing the corresponding translated sentence word or portion, means for storing a respective behaviour code of said sentence word or portion; and a means for integrating said first storage means forming a dictionary of words and sentences or sentence portions.

BRIEF DESCRIPTION OF THE SEVERAL VIEWS OF THE DRAWINGS

These and other advantages will appear from the following description of a preferred solution, with the aid of the included drawings, whose details are not to be considered limitative but only given as examples.

FIG. 12 represents the storage device of the new teaching words and sentence fragments encoded during the interactive correction operation.

FIG. 13 represents the choice device of the work sector divided in a plurality of dominions from 1 to 33 with a customizable optional 34 in the specific case the sector 10 (electronics) being selected.

In the case of FIGS. 4 and 5 only one sentence was quoted for simplicity, but it is evident that because sliding fields are involved, the document to be translated may be a multipage one.

DETAILED DESCRIPTION OF THE INVENTION

In the present invention, there is the advantage of giving the operator the possibility of progressively implementing during the same translation not only the missing words or the repetitive and common sentences as in the prior art known systems, but also sentence fragments, which thanks to the respective behaviour code given by the operator will be inserted and suitably be self-modified in the next translation sentence.

Thus, thanks to the well known repetitiveness of the expressions in the translation documents, the system automatically and rapidly continues to expand this new translation domain giving, after the first translated text pieces, thanks to said auto-learning of corrections (FM1-FM2, FM3) with said behavior code (FM4), a resulting maximum translation level and absolutely peerless in quality with respect to any known translation system.

The tests carried out gave such amazing results that even after only a little translation the errors in each sentence decrease to the minimum almost immediately reaching the average error/sentence value comprised between 1 and 2, for then reaching the error/sentences value>1.

The present invention also includes a means which provide at least three control and input lines:

the first upper one as sentence to be translated/sentence portion corresponding to the correction;

the second one as translated sentence/correct sentence portion; and the third one as a line for inputting the behaviour code corresponding to the correction.

Advantageously, the presence of a line which by means of a series of numbers indicates how the sentence composition was obtained, for single words and word fragments, thus allowing to let the operator know how the system found the translation sources (single words combined with sentence fragments) is provided. Thus there is the advantage of operating quickly and with the highest speed, having the possibility of carrying out a suitable control before the inputting.

The present invention further comprises a translation interface comprising at least two fields vertically scrollable in parallel; adjacent and placed one close to the other, one for the document to be translated and one for the translation. The interface has means to:

allow the simultaneous size variation of both fields, one for the text to be translated and one for the translated text; and keep the two fields at the same height;

scroll the two fields in parallel and simultaneously; and adjust the width of both fields in a proportion inverse to the length of the two documents: original and translation.

Thus the great advantage of being able to control and correct the translation by comparing it substantially aligned with the original.

During the display of an interactive translation window, a control which, after selecting a sentence word or portion to be translated in the window, enables the consultation of a parallel dictionary which suggests alternative translations of the selected word. Thus giving the operator the possibility of consulting on line a respective consultancy dictionary. There is also a control for stopping the interactive translation in process, which stores in accumulation in a pair of separate fields: the already translated and corrected part; and the corresponding part of the document which had to be translated.

This is for leaving only what remains of the still untranslated part in the field of the translation in process in order to recover it and the last not yet corrected sentence being translated corresponding to the first sentence of the not yet translated translation part, which at that moment was in the interactive window for the control. It is thus possible to interrupt an interactive translation without losing anything of what was previously translated correctly, and further to intervene in post-correction on the system by acting both on the part still to be translated and on the one just translated. Thus it is possible storing all the corrections made later, allowing to use them again in the next translations.

The present invention also includes a means for performing the post-correction after the text translation, on field of the translation, including means for:

locating the cursor position in the correction area or otherwise if a portion is stored by highlighting, automatically calculate the number of corresponding sentences and words of the translated document from the source;

on the basis of absolutely maintaining the punctuation positions, they provide in a screen window;

the previously highlighted sentence portion in the correction zone or the concerned whole sentence located by the cursor presence since the last correction; and the corresponding sentence of the document to be translated, in order to allow the operator to: define by highlighting the sentence fragment corresponding to the one concerned with the correction and provide a corresponding behaviour code for the storage, substantially in a way similar to what operated during the interactive translation.

Above said pair of fields, a control bar is provided for the control operations substantially forming a "T"-shaped base interface in which the upper cap of the "T" is the control bar by a combination of buttons and the "T"stem substantially separates the right field from the left field of said pair of fields of the document to be translated and translated document. Thus the whole is combined and integrated in a maximum performance.

Considering that the scanners are always dissociated from the computer and considering that this is caused by the dimension of the scanner and by the practical impossibility to manipulate sheets within the computer itself, it was thought to associate to the computer itself a scanner integrated in the case of the computer, and to avoid said dimension of the manipulation of the paper sheets to be read, it was innovatively thought to adopt the sideways entry and exit of the paper sheet, then all associated to OCR system for characters recognition.

In this way the paper document to be translated is automatically loaded in the machine and in the translation system for eventual control, rectification and following translation. The result of this structure substantially involves the possibility of integrating the scanner with the computer itself and therefore a sensitive improvement of the total time for effecting the translation from a paper document.

By using this advantageous and innovative system it is possible to also apply the respective printer on the opposite side of the scanning apparatus.

Figure 1:
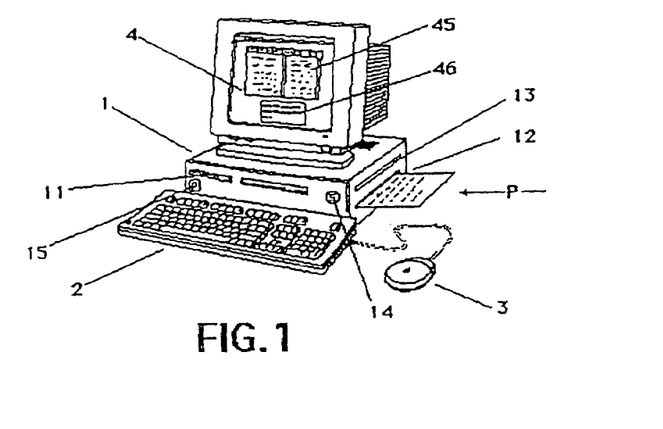
FIG. 1 is a view of the translating computer.

According to the figures and in particular referring to FIG. 1 it is noticed that the computer 1 has a desktop parallelepiped-like shaped with frontal entry for disks, CD etc. (11); side entry according to the invention for scanner (12) and respective outlet on the same side (13) of the scanned sheet.

The printed sheets exit with feeding of the same paper on the side of the scanner (12) being able to be provided on the other side (opposite side) or by feeding by extractable underlying drawer always on the side.

The computer 1 obviously is provided with means for realizing a complete operative element with keyboard 2, mouse 3 and monitor or screen 4 both in traditional version and in version "LCD"or other equivalent.

The scanner group (122) is integrated in the computer case (1) and is controlled by the push-button (14), and in a simplified version, the paper sheet (P) enters from the side MI and comes out through the side M2 to then be conveyed by conveying rollers: in the solution of FIG. 1 in exit from the same side by 180° rotation, thus avoiding to make the paper sheet pass under or over the mother card of the processors. In an alternative solution with exit on the other side, where a printer group for points line of known art having the same substantial shape of the scanner of FIG. 2 can be provided.

In such a case it is possible, by using the other push-button (15), to load from the scanner side (12) a white paper sheet "P"to make it come out as printed from the opposite side.

Figure 2:
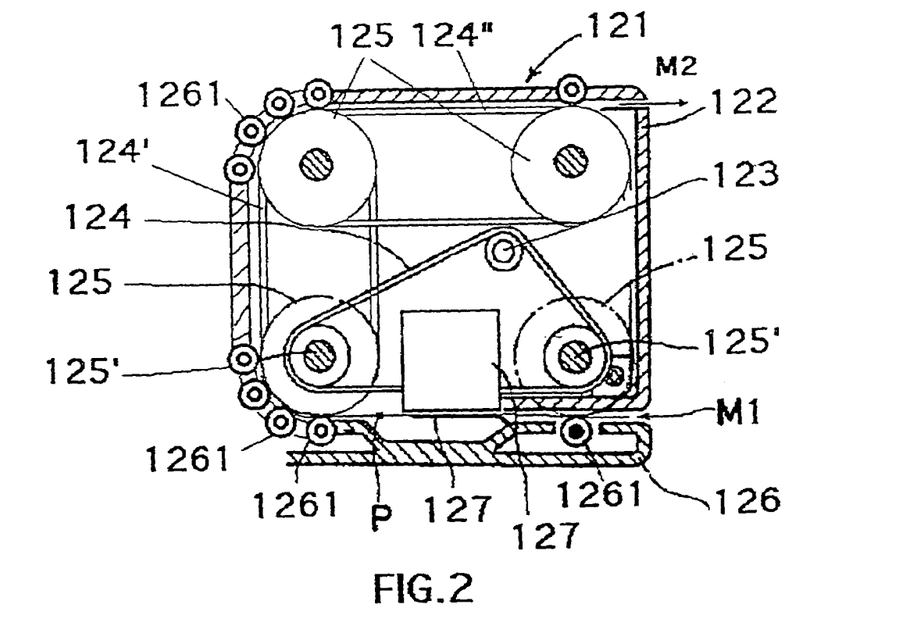
FIG. 2 is a sectional view of the scanner body inserted in the computer case.

The printing group is not illustrated as it is of known art and substantially similar to that of the scanner where in the place of the scanning unit (127) a printing unit (e.g. an ink-jet or thermal one) is installed.

In particular the scanner group (121) is of the static type and protected in a case (122), and the sheet is made to scroll within it (P) entering into one side (M1) and getting out from the other one (M2).

A step motor controlled by the computer (15-PC-CPU) or separate processor ((14-OCR-CPU-123), is provided for such purpose and it is operated by the control button external to the computer (14).

The motor (123) tows by belt 124 respective paper traction rolls (125), placed along bearing transversal axis (125') and operating by idle counter-rolls (1261), on an openable countercase (126) for the inspection and eventual extraction of the jammed sheet during the advancement.

A paper-presser 127 is provided in the lower countercase (126) to press the advancing paper against the linear scanning unit of known art (127) that includes the lighting device and the device to send the reading to the respective processor (14-OCR-CPU) or alternatively more simply to the same processor of the computer (15-PC-CPU) where by known OCR program the reading is captured and transformed in text "WP"for the translation or in case of a drawing, stored separately in a scanned documents storing folder (OCR or not).

Figure 3:
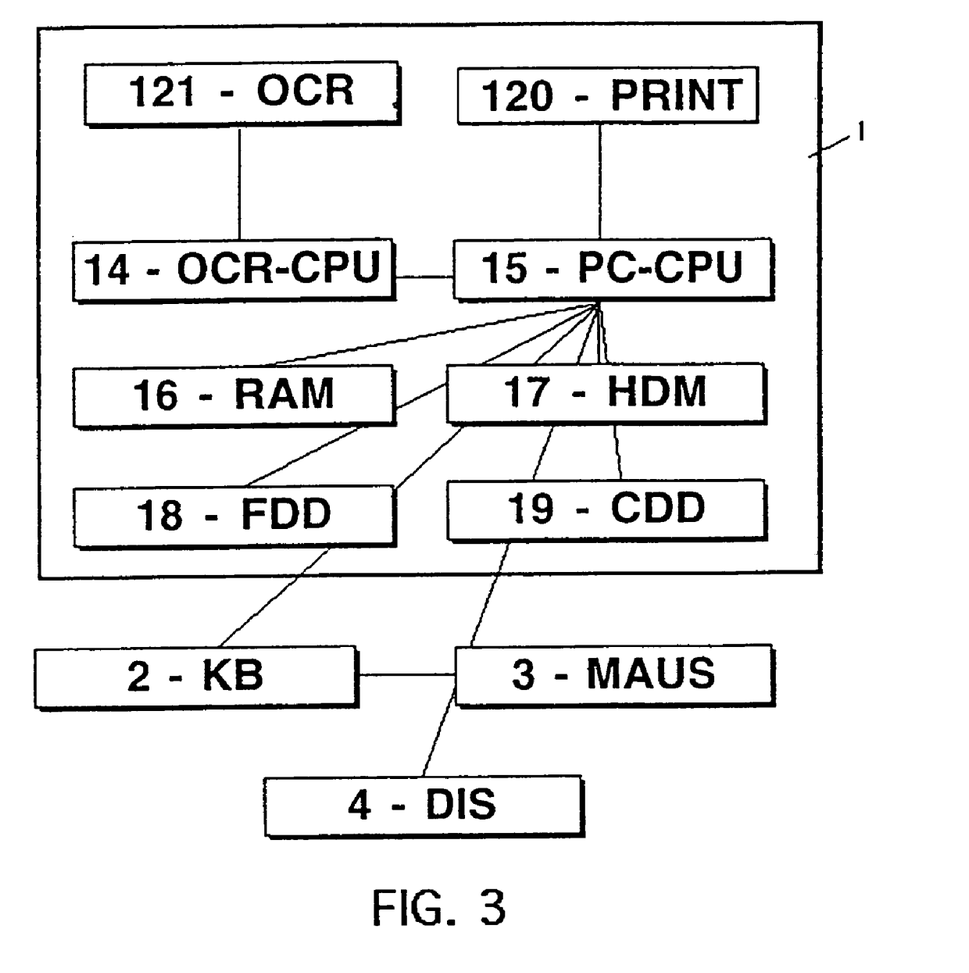
FIG. 3 is a view with blocks scheme of the computer structure and working system as in previous figures.

The structure of the new translating computer or translation station or translation desk, therefore preferably includes said characteristics and at least (See FIG. 3):

in the desktop parallelepiped case (1): a central processor (15-PC-CPU) with respective management card and control which is connected to; Memory (RAM 16); Disk fixed memory (17-HDM)

Extractable memories such as: magnetic memory disks (18-FDD)

Optic memory disks (19-CDD);

The whole including at least a system or programme OCR (121-OCR), and additionally being able and preferably providing a second processor for the separate treatment of the scanning (14-OCR-CPU) which always controls the scanning group (121).

Externally, as already said, the processor card (15-PC-CPU) is linkable to the keyboard (2-KB), mouse (3-MAUS), and Screen (4-DIS).

In case of the presence of the second processor "dual processor computer", a processor will serve to the normal translation routine of (15-PC-CPU) and a processor (14-OCR-CPU) which operates in parallel and is therefore also able to operate on the storage while the translation by the main processor continues.

Thus it is possible having work overlaps and while one translates or works with the computer in WP, also doing other work, for example scanning, printing and other.

Coming back to FIGS. from 6 to 9 it can be noticed that, in the specific case the bi-directional module "English-Italian-English"is indicated, able to operate also as "stand alone"and indicated with FL, being there many of these modules, each for language couples combination and having the same configuration with adjacent "T"—like parallel fields coupled with the control bar placed on the upper part.

Where the control types (always virtual push-buttons) are obviously different.

Figure 6:
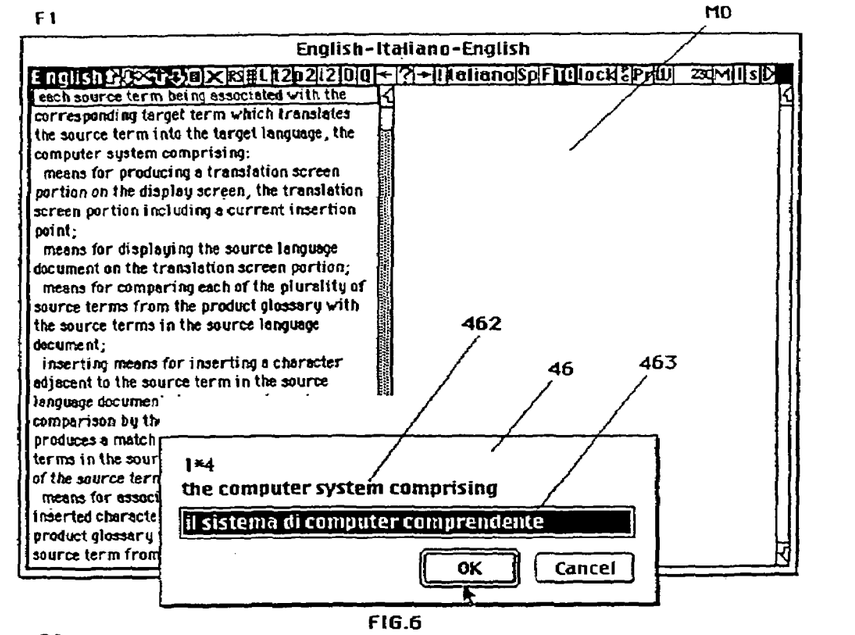
FIGS. 6 to 9 concern a series of subsequent phases of the translation process in the interactive-automatic way, by using a module in the specific case a bi-directional one recalled by the multilingual main management system (FIGS. 4–5)"English-Italian-English", bi-directional module, having a plurality of these modules according to the possible combinations between the different languages and recalled time by time by the main system, each module being able also to operate singularly without the assistance of the management system or main management.

The translation phases with interactive self-learning are the following ones:

Introduction of the English text in the left field in the desired way (import, copy and paste, writing or also coming from the automatic scanning system with characters recognition system (121-OCR), choice of the interactive translation mode (total quality) by pushing the button TQ and beginning of the translation.

Figure 4:
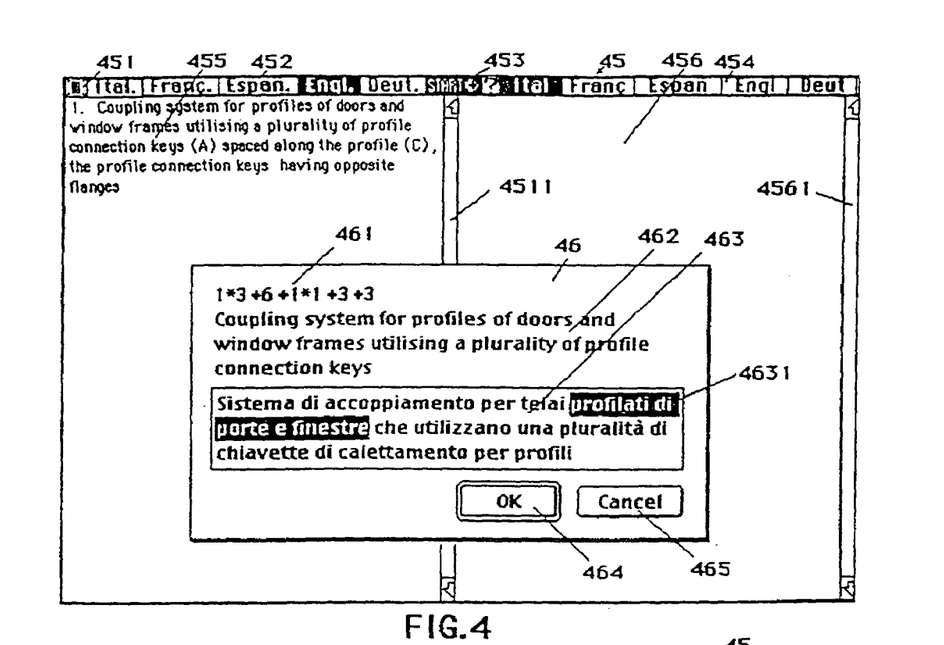
FIG. 4 is a view of the image that appears on the screen during the interactive translation and of the window, for the control, correction and self-learning of the portion concerned with the correction.
Figure 5:
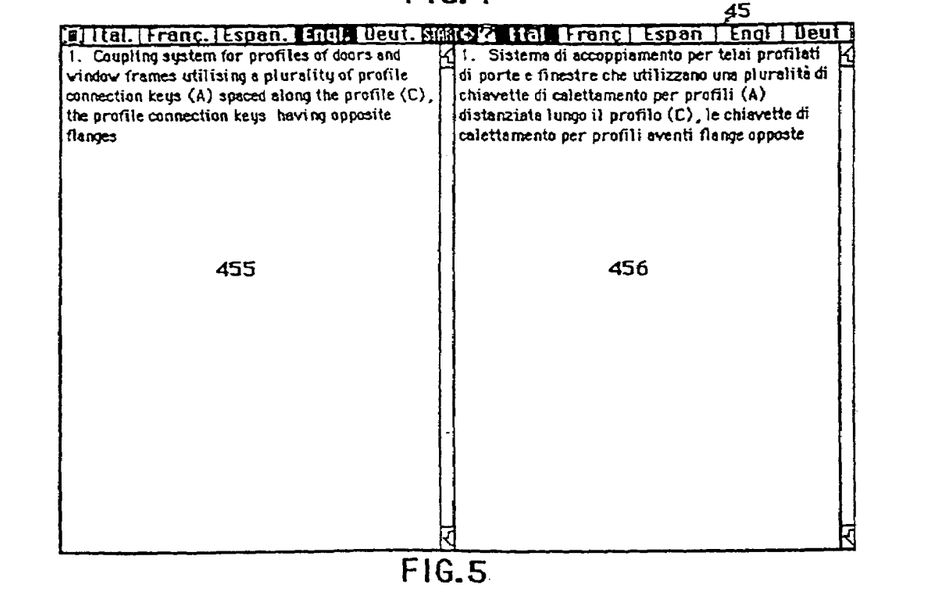
FIG. 5 is a visualization of the completed translation, for the final checking and following eventual post-correction.

After the automatic translation of the first sentence, said interactive window 46 appears automatically having indicated (FIG. 6):

in first line a numbers line that indicates in the specific case that the sentence has been translated word by word (1*4=4), not having found prememorized sentences portions (in the case of FIG. 4 instead the sentence, longer, had the code 1*3+6+1*1+3+3 that means=the first three words translated singularly, then a 6 words string translated, then a single word and then two strings of 3 words each. The puzzle thus made up has given the resulting sentence that as it can be seen is of enough acceptable quality;

in the second line the sentence being translated;

in the third line the automatically translated sentence to be controlled.

Figure 7:
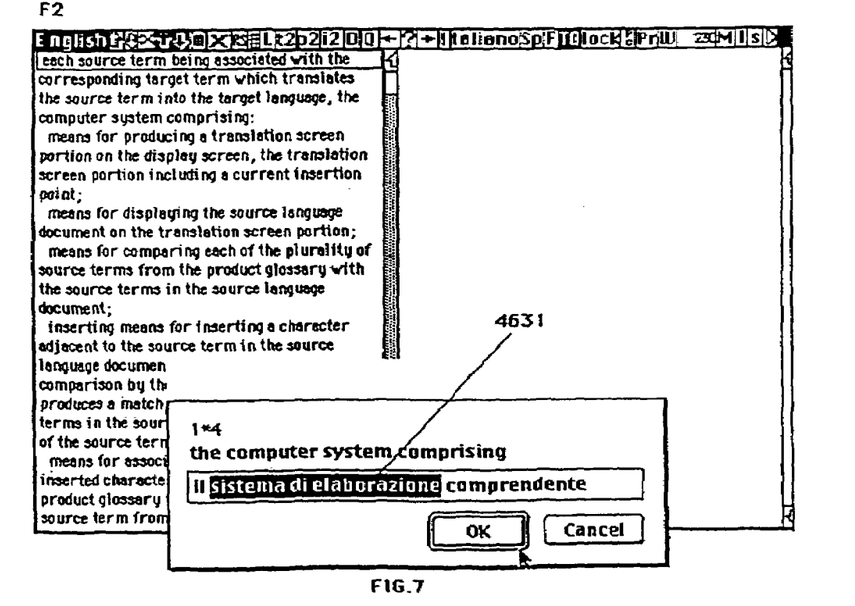

The operator carries out the correction of the non appreciated sentence portion (computer system=processing system) that is highlighted (4631 FIG. 7).

Figure 8:
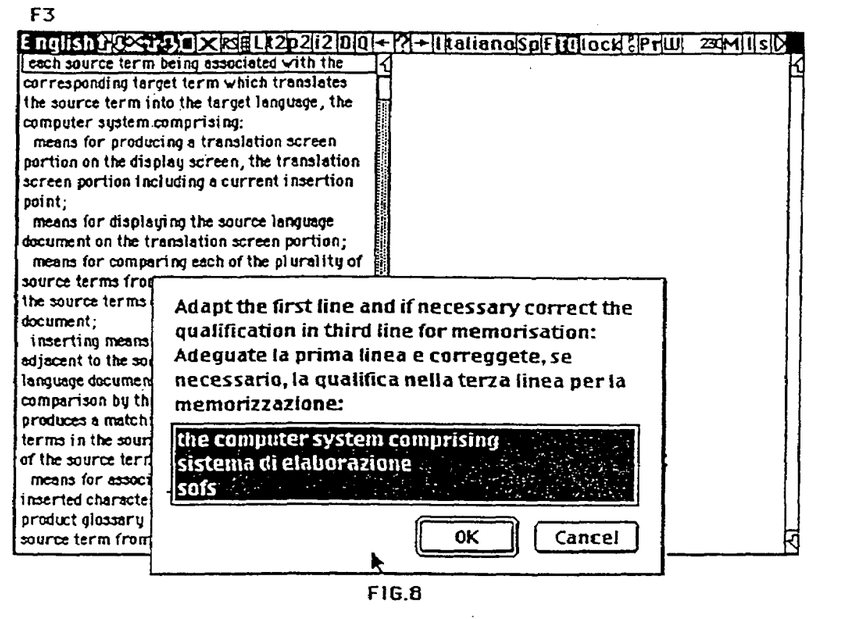

The operator has either the possibility to go on by pushing "OK" (464) or to get out by pressing "Cancel" (465):

if he presses "cancel" the system either optionally asks if he wants to consult one of the words being translated to supply alternatives of translation or it stops the translation by accumulating the translated sentence in accumulator;

if he presses "OK" the window of FIG. 8 appears in which it can be seen that in line 2 only the correct sentence fragment appears and he asks to adapt the correspondent original sentence portion accordingly to line 2, proposed in third line a qualification code.

Figure 9:
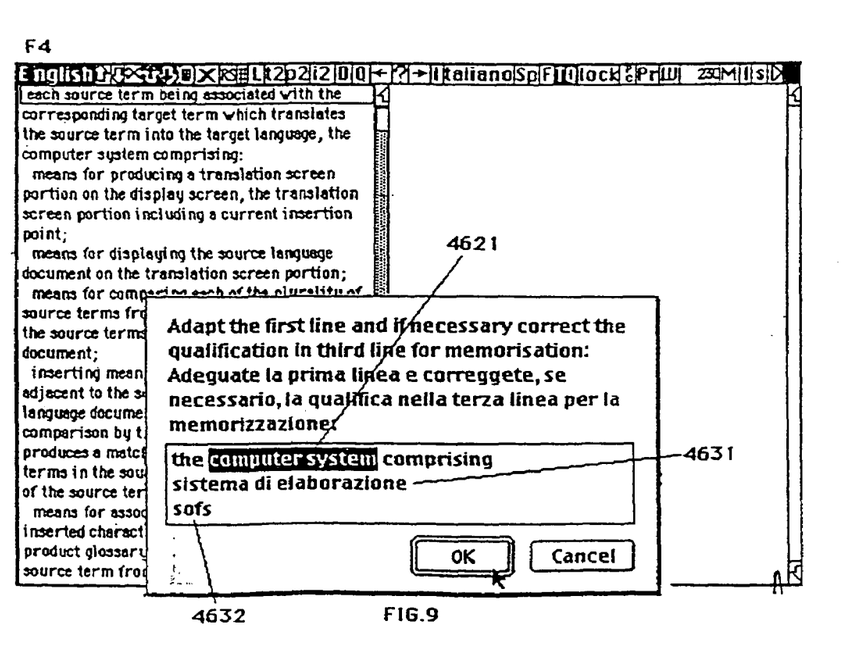

By highlighting the portion, corresponding fragments of the sentence are translated (4621) on the first line and by pushing "OK" (FIG. 9).

Figure 10:
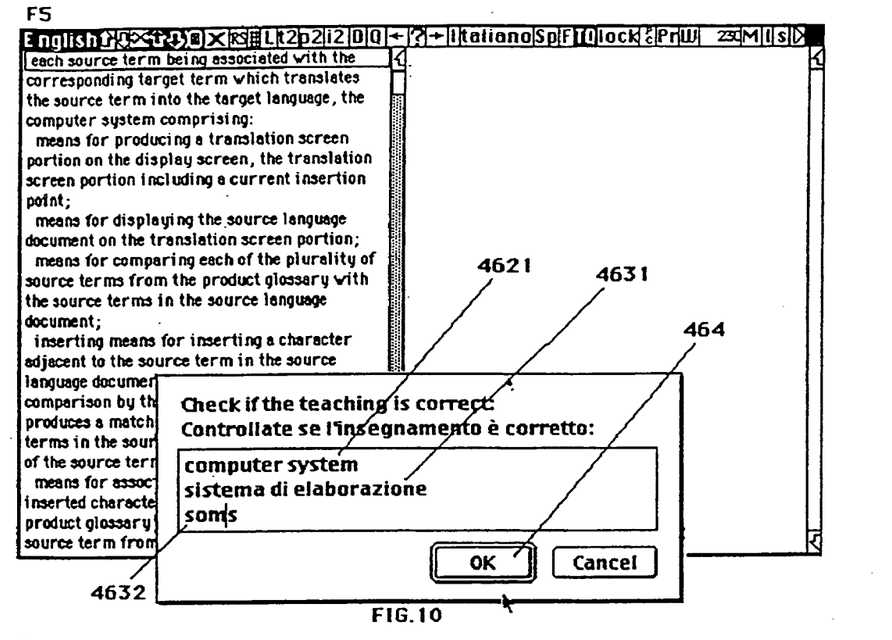
FIG. 10 represents one of the cards showing the interactive storage means of the words and sentence fragments that characterize the system.

FIG. 10 appears where on three lines the operator must check the teaching (4621–4631), in the specific case he corrects from "sofs" (automatically supplied by the processor because it ends with "a")=singular feminine noun in "soms"=singular masculine noun (4632), and by pushing "OK" (464), the teaching is automatically stored in the interactive memory (FM FIG. 12), that includes:

The field of the first fragment word for the research (FM 1), the field of the fragment portion following the first word (FM2), the field of the translation (FM3, the field of the behaviour code (FM4), being further provided a personalization field (FM5), in function of the chosen sector or work domain (DM).

Figure 11:
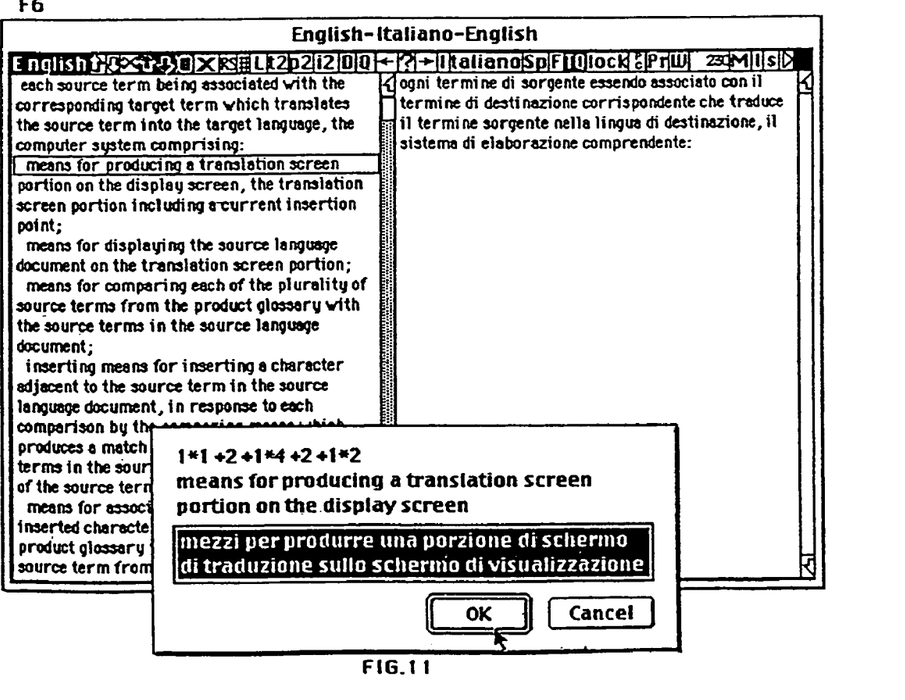
FIG. 11 represents the option card for the choice before the translation of the desired work domain, technology, medicine, agriculture, etc.

FIG. 11, the completely and perfectly translated and controlled sentence appears in the left field and the interactive window appears again proposing to the translator the control of the next sentence and so on.

With this system it was found:

a practically perfect translation controlled by the operator;

a progressive teaching of the sentence fragments concerning the corrections avoiding the computer to repeat the previous errors; and the translation time is greatly reduced, going over 50% and with maximum quality.

In the case of the Tq="total Quality"system, no more substantial errors were found (as for example the repetition of good translations as from window of FIG. 11), it will be possible to opt for the automatic translation and postcorrection="postediting", in which always with the same method it will be possible to memorize the respective corrections.

In the preferential solution the scanner (121) is substantially placed on the side and arranged for a sheet path substantially around of the scanning head (127), the sheet in scanning (P) obliged to follow a substantially "C"-like path for entering into and getting out from the same side d, on the computer side, turning around the scanning head (127). In this way there is the very great advantage, of being able to extract the central body of the scanning group (122) that to such purpose is laterally enclosed within the "C"-like housing (126), for easily carrying out the maintenance and extracting an eventually jammed sheet.

In fact the computer is characterized in that said scanner group (121) is substantially made up of a substantially "C"-like case as paper guide (P), external (126), where the internal group (122) containing the reading head (127) and the paper advancement system (123–124/124'/124"–125) is inserted and laterally extractable.

What is claimed is:

1. A machine translation method to be used in a machine translation system, said method comprising:

storing of words and strings with more words with respective correct translations forming a dictionary of words and sentences and sentence portions;

receiving a text to be translated on a first screen field;

storing a translated text into a second screen field;

progressively searching the text to be translated, comparing the text to be translated to the dictionary; and obtaining a progressive translation of said text to be translated;

wherein obtaining a progressive translation further comprises:

performing automatic translation as the translation text, selecting a sentence fragment of the translation text wherein the automatic translation is not correct, and sending an input indicating re-translation of the translation text;

presenting a window appears having a selected sentence fragment from the translation text in a first line, and an automatic translation of said selected sentence fragment in a second line;

correcting the automatic translation of said selected sentence fragment in a said second line;

inputting a qualification code as an instruction in a third line of said window, said instruction being a syntactical function code to associate said selected sentence fragment with the corrected automatic translation in said second line;

recording the corrected automatic translation and the instruction;

storing the first, second, and third lines of said window in said dictionary, said selected sentence fragment in said first line having a first word and a following portion, the corrected automatic translation being in said second line, said instruction of said third line being a syntactical function code associated with personalization of a chosen sector or work domain in said dictionary;

re-translating automatic translation such that the corrected automatic translation is obtained for said selected sentence fragment in said second screen field.

* * * * *